(12) United States Patent
Zheng et al.

(10) Patent No.: US 8,976,543 B1
(45) Date of Patent: Mar. 10, 2015

(54) FULL BRIDGE POWER SUPPLY WITH DIGITAL FEEDBACK

(75) Inventors: Yan Zheng, Mount Laurel, NJ (US); John Tsinetakes, Moorestown, NJ (US); Gregory Scott Bruce, Abington, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 935 days.

(21) Appl. No.: 13/048,419

(22) Filed: Mar. 15, 2011

(51) Int. Cl.
*H02M 7/5383* (2007.01)
*H02M 3/335* (2006.01)

(52) U.S. Cl.
USPC .............................................. 363/17; 363/98

(58) Field of Classification Search
USPC ............................................ 363/17, 98, 132
See application file for complete search history.

(56) References Cited

U.S. PATENT DOCUMENTS

| | | | |
|---|---|---|---|
| 4,864,479 A | | 9/1989 | Steigerwald et al. |
| 5,477,135 A | * | 12/1995 | Baker ........................... 324/130 |
| 5,627,717 A | * | 5/1997 | Pein et al. ........................ 361/95 |
| 6,639,812 B2 | * | 10/2003 | Nakazawa et al. ......... 363/21.07 |
| 7,157,889 B2 | * | 1/2007 | Kernahan et al. ............. 323/268 |
| 7,414,371 B1 | * | 8/2008 | Choi et al. ..................... 315/291 |
| 7,426,645 B2 | * | 9/2008 | Leung et al. ................... 713/300 |
| 7,586,767 B1 | * | 9/2009 | Prodic et al. .................... 363/65 |
| 8,063,569 B2 | * | 11/2011 | Kimura .......................... 315/219 |
| 8,232,784 B2 | * | 7/2012 | Popescu et al. ................ 323/280 |
| 2009/0046482 A1 | | 2/2009 | Smith |
| 2011/0194206 A1 | * | 8/2011 | Sase et al. ....................... 360/75 |

OTHER PUBLICATIONS

"BiCMOS Advanced Phase-Shift PWM Controller", Texas Instruments, May 2009.

* cited by examiner

*Primary Examiner* — Jessica Han
(74) *Attorney, Agent, or Firm* — Howard IP Law Group, PC

(57) ABSTRACT

A circuit includes a full-bridge converter circuit coupled to a transformer for converting a first voltage level to a second voltage level. A sensing circuit is coupled to the transformer for sensing a size of a load coupled to the transformer. A digital feedback circuit is coupled to the full-bridge converter and to the sensing circuit for adjusting a rate at which the full-bridge converter is switched based on a signal received from the sensing circuit.

13 Claims, 3 Drawing Sheets

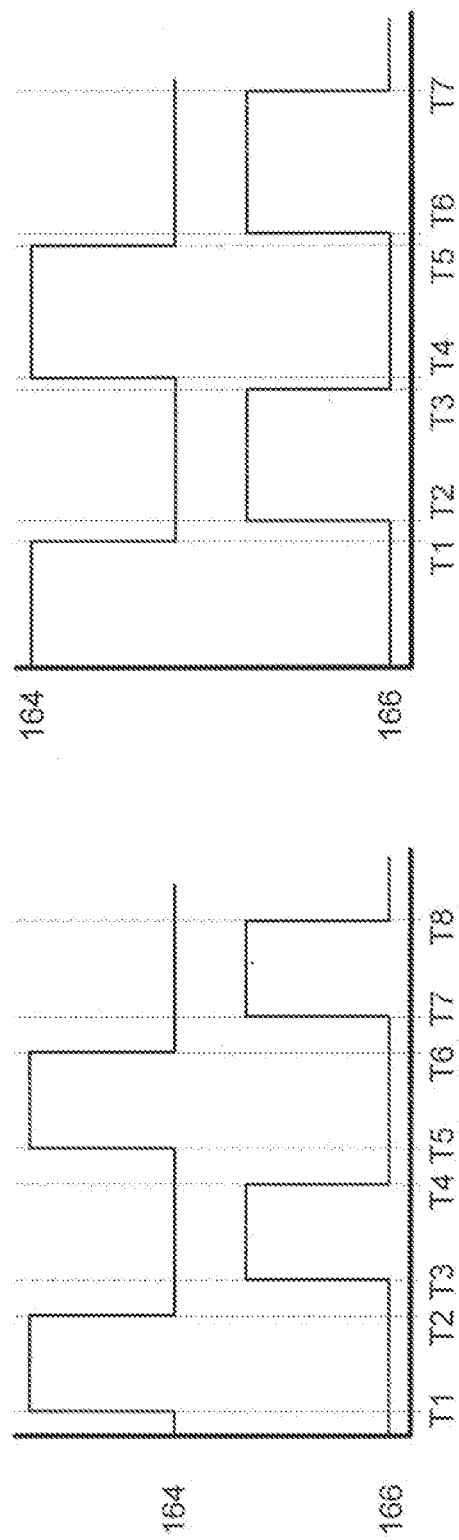

FULL BRIDGE POWER SUPPLY WITH DIGITAL FEEDBACK

FIELD OF DISCLOSURE

The disclosed circuit and method relate to power supplies. More particularly, the disclosed circuit and method relate to power supplies that include DC-to-DC converters, which utilize full bridges.

BACKGROUND

Many direct current ("DC") to DC converters utilize a phase-shifted resonant bridge ("PSRB") to convert a primary DC voltage received at an input to a regulated DC voltage at its output. In PSRB zero voltage switching ("PSRB-ZVS") under a light output load, the primary full bridge metal oxide semiconductor field effect transistors ("MOSFET") switches undergo hard switching resulting in increase power loss and inefficiency and electromagnetic interference ("EMI").

SUMMARY

A circuit is disclosed that includes a full-bridge converter circuit coupled to a transformer for converting a first voltage level to a second voltage level. A sensing circuit is coupled to the transformer for sensing a size of a load coupled to the transformer. A digital feedback circuit is coupled to the full-bridge converter and to the sensing circuit for adjusting a rate at which the full-bridge converter is switched based on a signal received from the sensing circuit.

A method is also disclosed that includes providing a first voltage to a load coupled to a transformer, sensing a second voltage across a sensing resistor coupled in series to the load, and converting the second voltage to a digital representation of the second voltage. A first rate at which to drive transistors of a full-bridge converter is selected based on the digital representation of the second voltage, and the transistors of a full-bridge converter are driven at the first rate.

Also disclosed is a circuit that includes a first transistor having a first source coupled to a first power supply node and a first drain coupled to a first node, a second transistor having a second source coupled to the first power supply node and a second drain coupled to a second node, and a third transistor having a third source coupled to a second power supply node and a third drain coupled to the first node. A fourth transistor has a fourth source coupled to the first power supply node and a fourth drain coupled to the second node. A primary winding of a transformer is coupled to the first and second nodes for stepping down a first voltage to a second voltage for supplying to a load. A sensing circuit is coupled between a secondary winding of the transformer and the load, and a digital feedback circuit is coupled to the sensing circuit for adjusting a rate at which the first, second, third, and fourth transistors are turned on and off based on a size of the load.

BRIEF DESCRIPTION OF THE DRAWINGS

FIGS. 3A and 3B are examples of timing diagrams of the power supply circuit 100 under different load conditions.

DETAILED DESCRIPTION

Figure 1:
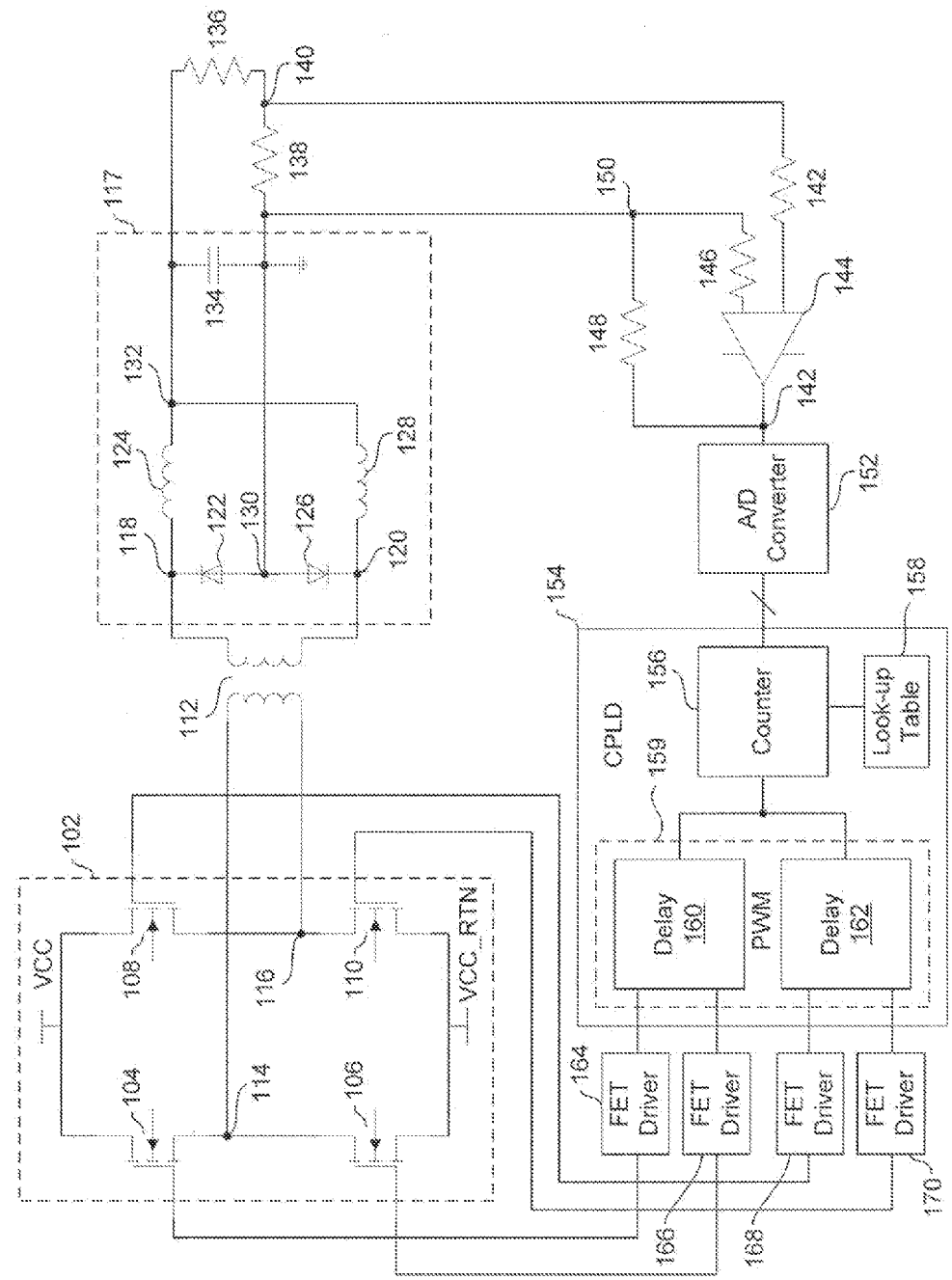
FIG. 1 is a schematic illustration of one example of an improved power supply having digital feedback that dynamically adjusts the switching time.

FIG. 1 illustrates one example of an power supply circuit that includes digital feedback that dynamically adjusts switching time based on the size of the load being driven to avoid hard switching. The power supply circuit includes a full-bridge converter 102 comprising four (4) metal-oxide semiconductor field effect transistors ('MOSFETS) 104, 106, 108, 110 coupled to a transformer 112. Transistor 104 has its source coupled to coupled to a first voltage supply rail set at VCC to which the source of transistor 108 is also coupled. In some embodiments, VCC may have a voltage potential of approximately 200-400 VDC with respect to ground. The drain of transistor 104 is coupled to node 114, which is also coupled to the drain of transistor 106. Transistor 106 has its source coupled to second voltage supply rail set at VCC_RTN to which the source of transistor 110 is also coupled. In some embodiments, VCC_RTN has a voltage potential approximately equal to that of ground. However, power supply circuit 100 may support floating returns such that VCC_RTN may have a voltage potential of approximately 30 VDC with respect to ground. In such embodiments, VCC may have a higher voltage potential with respect to ground. For example, if VCC_RTN has a voltage potential with respect to ground of 30 VDC and VCC has a voltage potential of 250 VDC with respect to VCC_RTN, then VCC has a voltage potential with respect to ground of approximately equal to 280 VDC. One skilled in the art will understand that VCC and VCC_RTN may have higher or lower voltages with respect to ground and to each other. The drain of transistor 110 is coupled to the drain of transistor 108 at node 116.

Nodes 114 and 116 are coupled to the ends or ports of one coil, e.g., the primary coil or winding, of transformer 112 with the ports of the other coil or winding (e.g., the secondary winding) being coupled to nodes 118 and 120 of current-doubler rectifier 117. Node 118 is coupled to the cathode of diode 122 and to inductor 124, and node 120 is coupled to the cathode of diode 126 and to inductor 128. Inductors 124 and 128 are also coupled to node 132, and the anodes of diodes 122 and 126 are coupled together at node 130. A capacitor 134 is coupled between nodes 130 and 132 and is disposed in parallel with load 136, which is illustrated as a resistor. Sensing resistor 138 is coupled to node 130 and in series with load 136 at node 140.

A feedback signal is taken across sensing resistor 138 with a resistor 142 being coupled to node 140 and to a first input of an amplifier 144, which may be an operational amplifier ("op amp") as will be understood by one skilled in the art. The second input of amplifier 144 is coupled to resistor 146, which is coupled to resistor 148 and to node 130 at node 150. The output of amplifier 144 is coupled to the input of an analog-to-digital ("A/D") converter 152 and to resistor 148. Resistors 142, 146, and 148 may be sized to provide the desired amount of amplification as will be understood by one skilled in the art.

A/D converter 152 provides a multi-bit output to a complex programmable logic device ("CPLD") 154, which includes a counter 156 in communication with a look-up table 158. The output of counter 156 is coupled to the inputs of delay blocks 160 and 162 of pulse width modulator ("PWM") 159. Delay blocks 160, 162 may be created in firmware of CPLD 154 using high-speed counters. For example, such high-speed counters may be coded in VHDL or Verilog as will be understood by one skilled in the art. One output of delay block 160 is coupled to the input of FET driver 164, and the other output of delay block 160 is coupled to the input of FET driver 166. Similarly, a first output of delay block 162 is coupled to FET driver 168, and a second output of delay block 162 is coupled to FET driver 170. In some embodiments, FET drivers 164, 166, 168, and 170 are MIC4416/4417 FET drivers available from Micrel Inc. of San Jose, California. However, one skilled in the art will understand that other FET drivers may be implemented as FET drivers 164, 166, 168, and 170.

FET driver 164 output a signal to the gate of transistor 104 such that FET driver 164 controls the turning on and off of transistor 104. FET driver 166 outputs a signal to the gate of transistor 106 such that FET driver 166 controls the turning on and off of transistor 106. FET driver 168 outputs a control signal to the gate of transistor 108, and FET driver 170 outputs a control signal to the gate of transistor 110 such that FETs 168 and 170 respectively control the turning on and off of transistors 108 and 110.

In operation, FET drivers 164, 166, 168, and 170 drive transistors 104, 106, 108, and 110 of full-bridge converter 102 such that transistors 104 and 110 are on at the same time transistors 106 and 108 are off and such that transistors 106 and 108 are on when transistors 104 and 110 are off. The periodic operation of full-bridge 102 provides a voltage to transistor 112 that is a fraction of the voltage between voltage supply rails VCC and VCC_RTN. Transistor 112 further steps down the voltage based on its turn ratio (e.g., 5:1), which may be varied as will be understood by one skilled in the art.

Accordingly, the voltage between nodes 118 and 120 is lower than the voltage between nodes 114 and 116. Diodes 122 and 126 in connection with inductors 124 and 128 increase the current from nodes 118 and 120 to node 132, which drives the output load of resistor 136.

The voltage across (or current through) sample resistor 138 is amplified or scaled by amplifier 144, which is then digitized by A/D converter 152. A/D converter 152 converts the analog input signal into a multi-bit (e.g., 2, 3, 4, or more bits) signal that is provided to counter 156 via a multi-bit bus. Counter 156 stores the multi-bit signal received from A/D converter 152 and look-up table 158 is accessed to determine the appropriate time at which transistors 104, 106, 108, and 110 of full-bridge 102 should be driven (or the applicable delay time between driving transistors 104, 106, 108, and 110) based on the load 136 as determined by the voltage across (or current through) sampling resistor 138. Look-up table 158 stores one or more driving (or delay) times that are each associated with multi-bit data structures that correspond to possible multi-bit outputs of A/D converter 152 such that transistors 104, 106, 108, and 110 are driven at an appropriate rate to avoid hard switching.

The delay or driving time is provided from counter 156 to delay blocks 160 and 162, which provide the applicable signals to FET drivers 164, 166, 168, and 170. FET drivers 164, 166, 168, and 170 turn on and off transistors 104, 106, 108, and 110 in accordance with the signal received from delay blocks 160 and 162. The feedback signal may be continuously be measured and adjustments to the frequency or rate at which transistors 104, 106, 108, 110 of full-bridge converter 102 are driven to avoid hard switching when the size of load 136 changes.

Figure 2:
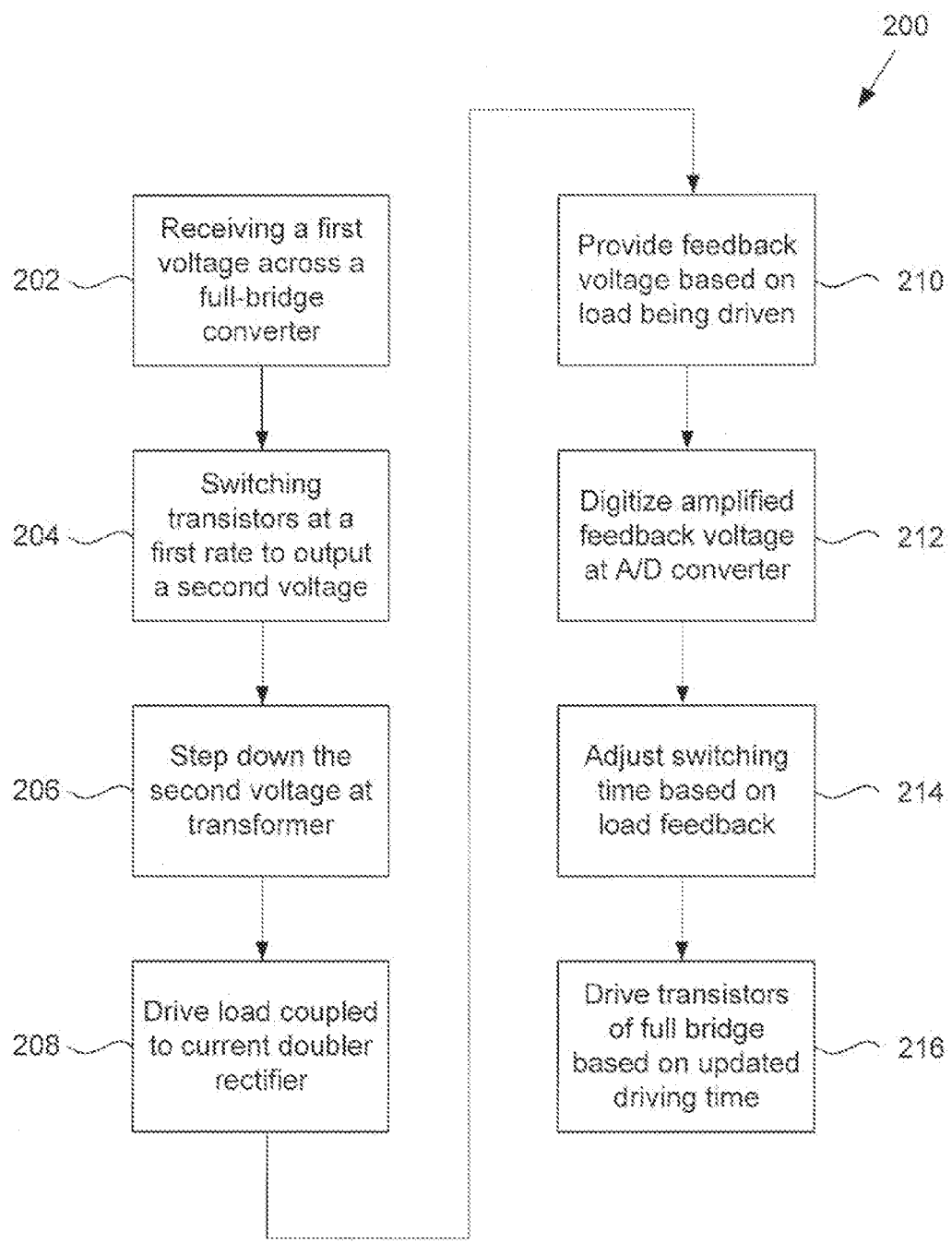
FIG. 2 is a flow chart of one example of a method of operation of the power supply illustrated in FIG. 1.

FIG. 2 is a flow chart illustrating one example of a method 200 of providing a DC-to-DC voltage conversion that may be performed by circuit 100. At block 202, a voltage is received across full bridge voltage converter 102. For example, a voltage, VCC, is received at the sources of transistors 104 and 108, and a second voltage, VCC_RTN, is received at the sources of transistors 106 and 110 to provide a voltage equal to VCC-VCC_RTN across full bridge 102 (i.e., between nodes 114 and 116).

At block 202, transistors 104, 106, 108, and 110 of full-bridge converter 102 are switched at a first rate to output a second voltage having a lower potential than the first voltage received across full-bridge converter 102. As described above, transistors 104 and 110 are turned on and off at the same time as are transistors 106 and 108, but transistors 104 and 110 are not in the same state (i.e., on or off) as transistors 106 and 108 at any given time. The voltage output from nodes 114 and 116 is based on the rate at which transistors 104, 106, 108, and 110 of full-bridge converter 102 are switched. As will be understood by those skilled in the art, full-bridge converter 102 is switched with a certain amount of deadtime in which each of transistors 104, 106, 108, and 110 are off before a transistor pair (e.g., transistors 104 and 110 or transistors 106 and 108) are turned on.

The voltage output from full bridge 102 is further stepped down by transformer 112 at block 206. The amount that the voltage output from full bridge 102 is stepped down by transformer 112 is based on the turn ratio of transformer 112. For example, the primary winding of transformer 112, which is coupled to nodes 114 and 116, may have five (5) times the number of turns than the second winding of transformer 112, which is coupled to nodes 118 and 120. A 5:1 turn ratio reduces the voltage by approximately/1;5 from nodes 114 and 116 to nodes 118 and 120. One skilled in the art will understand that transformer 112 may have other turn ratios including, but not limited to, 2:1, 3:2, :3:1, 4:1, 4:3, 5:2, and 6:1, to list a few possible turn ratios.

At block 208, the stepped down voltage drives a load coupled to transformer 112 through current-doubler rectifier comprising inductors 124 and 128, diodes 122 and 126, and capacitor 134. Sensing resistor 138 senses the size of the load being driven by the stepped down voltage and provides a feedback voltage to amplifier 144 at block 210. The size of load 136 is sensed by measuring the amount of current through 138 or voltage across resistor 138 as will be understood by those skilled in the art.

The feedback voltage is amplified by amplifier 144 and digitized by A/D converter 152. At block 214, a multi-bit signal is received at CPLD 154, which adjusts the switching time based on the size of the load as measured by the voltage across sensing resistor 138. To adjust the switching time, CPLD 154 receives the multi-bit signal output by A/D converter 152 at counter 156. CPLD 154 accesses a look-up table 158 to identify a switching time for driving transistors 104, 106, 108, and 110 of full bridge 102 based on the multi-bit voltage signal that identifies the size of load 136. For example, A/D converter 152 may provide a four-bit representation of a three volt signal to counter 156. CPLD 154 access look-up table 158 to identify the delay time (e.g., 10 ns) that corresponds to the multi-bit data structure of the three volt signal. The delay signal retrieved from look-up table 158 is provided to PWM 159. Delay blocks 160 and 162 of PWM 159 respectively output signals to FET drivers 164, 166, 168, and 170 based on the delay identified in the look-up table 158.

At block 216, FET drivers 164 and 166 respectively drives transistors 104, 106 and 108, 110 such that transistors 104 and 110 are on at the same time transistors 106 and 108 are off. As described above, the rate transistors 104, 106, 108, 110 are driven at block 216 is based on the size of load 136 as measured by sense resistor 138.

For example, FIG. 3A is one example of a timing diagram illustrating the control signals generated by FET drivers 164 and 166 when power supply 100 operates under a light load, and FIG. 3B is one example of a timing diagram illustrating control signals generated by FET drivers 164 and 166 when power supply 100 operates under a heavy load. As shown in FIG. 3A, FET driver 164 transitions from a logic zero or low to a logic one or high at time T1 while FET driver 166 continues to output a logic low control signal. At time T2, FET driver 164 transitions from a logic high to a logic low while FET driver 166 continues to output a logic low signal.

After a dead-time, i.e., period between times T2 and T3, of approximately 150 ns, for example, FET driver 166 transitions from outputting a logic low to a logic high at time T3. FET driver 166 continues to output a logic high until time T4 at which point FET driver 166 outputs a logic low as does FET driver 164. FET drivers 164 and 166 continue to output logic lows until time T5 when FET driver 164 outputs a logic high. FET drivers 164 and 166 continue to switch at times T6, T7, and T8 in the same fashion as described above with respect to times T2, T3, and T4 with a deadtime of approximately 150 ns between times T6 and T7.

As shown in FIG. 3B, FET driver 164 outputs a logic high control signal to the gate of transistor 104 while FET driver 166 outputs a logic low control signal to the gate of transistor 106 until time T1. At time T1, FET driver 164 transitions from outputting a logic high control signal to outputting a logic low control signal. Under a heavy load condition, the deadtime delay is shorter than the deadtime under a light load. For example, the period between times T1 and T2 in FIG. 3B may be approximately 50 ns compared to the 150 ns delay between times T2 and T3 in FIG. 3A. During the deadtime between times T1 and T2, both FET drivers 164 and 166 output logic zeros such that transistors 104 and 106 are in an off state.

At time T2, FET driver 166 transitions from outputting a logic low to outputting a logic high such that transistor 106 transitions from an off state to an on state. FET driver 166 continues to output a logic high signal until time T3, at which point FET driver 166 outputs a logic low signal. As illustrated in FIGS. 3A and 3B, FET drivers 164 and 166 output logic high control signals for a shorter period of time than they output logic low control signals. FET driver 164 outputs a logic high control signal at time T4 after a deadtime between times T3 and T4. FET drivers 164 and 166 switch at times T5, T6, and T7 in a similar manner as described with respect to times T1, T2, and T3. Although FIGS. 3A and 3B are described with reference to FET drivers 164 and 166 and transistors 104 and 106, one skilled in the art will understand that FET drivers 168 and 170 have a similar operation for controlling the turning on and off of transistors 108 and 110.

The circuit with digital feedback disclosed herein advantageously has increased efficiency by avoiding hard switching of the transistors of the full-bridge converter by precisely controlling the rate at which the transistors are switched based on the size of the load. The load size is precisely measured by measuring the secondary current through the load (i.e., current through load 136 as supplied by the secondary winding of transformer 112). Optimum driving times can be stored in the look-up table to increase efficiency by minimizing wasted duty cycle and hard switching. Additionally, reducing or eliminating hard switching reduces the amount of electromagnetic interference ("EMI") introduced into the circuit.

Although the circuit and method have been described in terms of exemplary embodiments, they are not limited thereto. Rather, the appended claims should be construed broadly, to include other variants and embodiments of the circuit and method, which may be made by those skilled in the art without departing from the scope and range of equivalents of the circuit and method.

What is claimed is:

1. A circuit, comprising:
    a full-bridge DC-to-DC converter circuit, comprising at least two transistor pairs, coupled to a transformer for converting a first voltage level to a second voltage level;
    a sensing circuit coupled to the transformer for sensing a size of a load current coupled to the transformer; and
    a digital feedback circuit coupled to the full-bridge converter and to the sensing circuit for outputting control signals for adjusting a rate at which the full-bridge converter is switched based on a signal received from the sensing circuit, the digital feedback circuit including an analog-to-digital converter for converting an analog signal received from the sensing circuit to a digital signal, and a complex programmable logic device for receiving the digital signal and for determining a delay time using a look-up table storing delay times corresponding to multi-bit representations of voltages;
    wherein the control signals are output based on the determined delay time in a manner so as to prevent the transistor pairs from being in a concurrently active state.

2. The circuit of claim 1, further comprising a current-doubler rectifier circuit coupled between a second coil of the transformer and the sensing circuit for rectifying a voltage across the secondary winding of the transformer.

3. The circuit of claim 1, wherein the sensing circuit includes:
    a resistor coupled in series with the load, and
    an amplifier coupled to the resistor for amplifying a voltage drop across the resistor.

4. The circuit claim 3, wherein an output of the amplifier is coupled to an analog-to-digital converter that converts an analog signal to a digital signal for inputting to the digital feedback circuit.

5. A method, comprising:
    providing a first voltage to a load coupled to a transformer;
    sensing a load current by measuring a second voltage across a sensing resistor coupled in series to the load;
    converting the second voltage to a digital representation of the second voltage;
    selecting a first rate at which to drive at least two pairs of transistors of a full-bridge DC to DC converter based on the digital representation of the second voltage, the selecting comprising accessing a look-up table configured with a plurality of different rates associated with a respective plurality of different multi-bit signals each representing a voltage; and
    driving the at least two pairs of transistors of the full-bridge DC to DC converter at the first rate so as to prevent the transistor pairs from being in a concurrently active state.

6. The method of claim 5, wherein the load is coupled to a secondary winding of the transformer and the full-bridge converter is coupled to a primary winding of the transformer.

7. The method of claim 5, further comprising:
    amplifying the second voltage to provide a third voltage;
    generating a digital representation of the third voltage;
    selecting a second rate at which to drive the transistors of the full bridge converter based on the digital representation of the third voltage; and
    driving the transistors of the full-bridge converter at the second rate.

8. The method of claim 5, further comprising:
    outputting a voltage from a full-bridge converter to a primary winding of the transformer; and
    stepping down the voltage at the transformer to provide the first voltage.

9. A circuit, comprising:
    a first transistor of a full bridge DC to DC converter having a first source coupled to a first power supply node and a first drain coupled to a first node;
    a second transistor of the full bridge DC to DC converter having a second source coupled to the first power supply node and a second drain coupled to a second node;

a third transistor of the full bridge DC to DC converter having a third source coupled to a second power supply node and a third drain coupled to the first node;

a fourth transistor of the full bridge DC to DC converter having a fourth source coupled to the second power supply node and a fourth drain coupled to the second node;

a primary winding of a transformer coupled to the first and second nodes for stepping down a first voltage to a second voltage for supplying to a load;

a sensing circuit coupled between a secondary winding of the transformer and the load; and a digital feedback circuit coupled to the sensing circuit for outputting control signals for adjusting a rate at which the first, second, third, and fourth transistors are turned on and off based on a load current sensed by the sensing circuit, the digital feedback circuit comprising an analog-to-digital converter for converting an analog signal received from the sensing circuit to a multi-bit digital signal; and a programmable logic device including a look-up table in which a plurality of rates for turning on and off the first, second, third, and fourth transistors are associated with respective multi-bit digital signal values representing values of the sensed load current;

wherein the first and third transistors comprise a first pair of transistors, the second and fourth transistors comprise a second pair of transistors, and the control signals are output based on the determined rate in a manner so as to prevent the first and second transistor pairs from being in a concurrently active state.

10. The circuit of claim 9, wherein the sensing circuit includes an amplifier having first and second inputs and a resistor coupled between the first and second inputs of the amplifier.

11. The circuit of claim 9, further comprising:
a first driver coupled to a first output of the digital feedback circuit and to the gates of the first and third transistors for turning on and off the first and third transistors; and
a second driver coupled to a second output of the digital feedback circuit and to the gates of the second and fourth transistors for turning on and off the second and fourth transistors.

12. The circuit of claim 9, further comprising a current-doubler rectifier disposed between the secondary winding of the transformer and the sensing circuit, the current-doubler rectifier including:
first and second inductors coupled to the secondary winding of the transformer;
a first diode having a cathode coupled to a third node disposed between the secondary winding of the transformer and to the first inductor and an anode coupled to a fourth node; and
a second diode having a cathode coupled to a fifth node disposed between the secondary winding of the transformer and to the second inductor and an anode coupled to the fourth node,
wherein the fourth node is coupled to the sensing resistor.

13. A system for adjusting the timing of a full-bridge DC to DC converter comprising at least two transistor pairs and configured to apply an output to a variable load, comprising:
a sensing circuit responsive to the output of the full-bridge converter for sensing a load current;
an analog to digital converter configured to convert an analog signal representing the sensed load current into a digital signal; and
a programmable logic device configured to:
receive the digital signal representing the sensed load current;
access a look-up table of delay times corresponding to different load currents for controlling on/off timing of the full-bridge converter;
selecting from said look-up table a delay time corresponding to the sensed load current;
output control signals according to the selected delay time and the sensed load current for controlling the on/off timing of the full-bridge converter, wherein the control signals are output based on the determined delay time in a manner so as to prevent the transistor pairs from being in a concurrently active state.

* * * * *